Aug. 2, 1955     H. J. PREMO     2,714,270
ICE FISHING DEVICE
Filed April 14, 1953
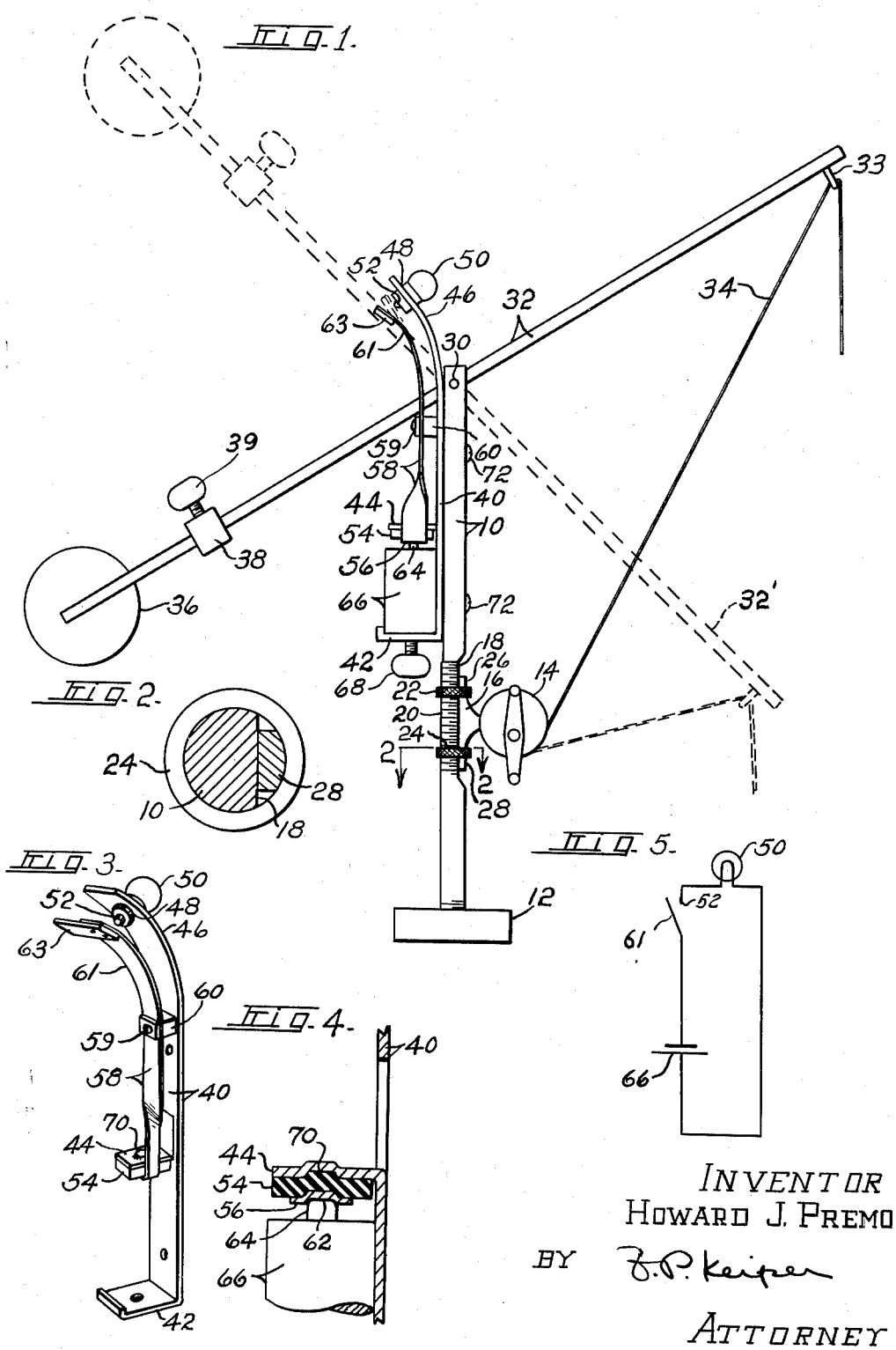
INVENTOR
HOWARD J. PREMO
BY *B. P. Keiper*
ATTORNEY

United States Patent Office 2,714,270
Patented Aug. 2, 1955

2,714,270
ICE FISHING DEVICE
Howard J. Premo, Massena, N. Y.
Application April 14, 1953, Serial No. 348,723
5 Claims. (Cl. 43—17)

This invention relates to devices for ice fishing, commonly referred to as "tip-ups," and more particularly to a device having flagging means by day and an intermittent flashing signal by night.

It is common practice in northerly climates, to fish through holes cut in the ice, and for a single attendant to provide and care for a plurality of lines for this purpose, a single line being projected through a single hole cut in the ice. In practice, such line is connected to a reel-supporting device, anchored on the ice adjacent the hole and adapted to hold the catch until an attendant in the course of making the rounds, can remove the catch and prepare the line for a subsequent catch.

The present invention is directed to an improved device of the character described, having rigidity and a minimum number of moving parts. The invention is further directed to a device in which a yielding support for the line is provided, and in which such yielding support acts as a signalling device. Further, the invention is directed to a night signalling device wherein a flashing signal is effected upon actuation of the yielding support and in which the flashing signal discontinues in the event of discontinuance of the movement of the yielding line support. Still further, the invention is directed to a bracket assembly of rugged economical construction embodying few parts, and comprising the electrical circuit of the flashing signal.

The above and other novel features of the invention will appear more fully hereinafter from thte following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevational view of the ice fishing signalling device;

Figure 2 is an enlarged sectional view through the column and reel support, taken on the line 2—2 of Figure 1;

Figure 3 is a perspective view of a sub-assembly, including the electrical conductors;

Figure 4 is a sectional view taken through one of the dry cell contacting elements; and Figure 5 is a circuit diagram.

Referring to Figure 1 of the drawings, there is shown a stand comprising a column 10, mounted in a base 12, the latter being adapted to be emplaced on the ice by packing wet ice and snow therearound, it being understood that upon freezing, a solid support results. The stand is located adjacent a hole in the ice through which the end of the fishing line extends. The column 10 is provided with a standard reel having a manual lock (not shown) 14, the base 16 of which engages a flat portion 18 of the column. The column is threaded as at 20, and provided with ring nuts 22 and 24 adapted to be threaded over the opposite reel base ends 26 and 28.

On the upper end of the column, and on one side thereof, is freely pivoted as at 30 a light boom 32, one end of which is provided with an eye 33 for receiving the fish line 34, and the other end of which is provided with a signal disk or flag 36, and an adjustable counterweight 38 having a thumb screw 39. In practice, the line 34 extends from the locked reel 14, through the eye 33, and thence through the hole in the ice to such a depth as may be desired. The weight 38 is adjusted to normally hold the boom with the eye end thereof in the raised position shown, the adjustment compensating for the weight of the line and sinker, and any water currents tending to add extra tension to the line. In the event of a strike, however, the boom readily yields to the tug on the line, and will tilt to the position shown at 32', lifting the flag 36 to indicate a catch.

In order to provide a signal, visible at night, there is affixed to the column 10, a bracket assembly (see Figure 3) comprising a bracket member 40, having an integral battery angle support portion in the form of an arm 42, and a contact support arm 44, which, if desired, may be struck from the member 40. The upper end 46 of the member 40 is provided with a threaded aperture 48 adapted to form a socket for and receive a miniature electric flashlight lamp 50, the contact end 52 of which projects through the member 40.

The contact support arm 44 is provided with a block of insulation 54, against the under side of which is positioned an end 56 of a conductor strap 58, such strap extending upward along and in spaced relation to the bracket member 40. The strap along the middle is supported as at 59 on an insulator block 60, and the upper end 61 is shaped to normally be spaced from the contact end 52 of the lamp 50. The upper end 61 of the strap is provided with a laterally extending insulating arm 63, such arm being adapted to extend into the path of movement of the boom 32. The strap is preferably made of resilient conductive material such as phosphor bronze, brass, or stainless steel, while the bracket may be formed of any rigid metal stock.

The lower end 56 of the conductor strap 58 may have a depression 62 formed therein to receive the end 64 of an electric cell 66. The lower end of such cell, which may be of the ordinary flashlight type, is positioned upon the angle support 42, there being provided a thumb screw 68 which is adapted to press against the bottom of the cell to urge the cell upward into good electrical contact with the strap end 56 and depression 62, and at the same time, assure contact of the other cell terminal with the bracket member 40. The insulation 54 may have a depression to receive the end 56 of the strap and can, if desired, be seated in a similar depression 70 in the arm 44. The insulation 54 and strap end may be bonded together, if desired, although it will appear that the insulated support 59 will be sufficient to hold the parts together, and that when a cell is assembled in place, all parts are firmly secured against displacement.

The bracket member 40 and the upper end 61 of the contact strap are curved so that the extreme ends thereof assume a somewhat tangential relationship to the weighted end of the boom, when in the position shown at 32'. It will be seen also that the bracket member and strap together form an assembly secured to the column as by fastening means as at 72, so that the entire construction comprises few parts, economical of manufacture, while at the same time, providing a rugged structure certain of operation.

When a strike is effected, it will be appreciated that the boom will yield to the pull on the line resulting from the attempts of the fish to escape, and each time the boom is tilted to the position shown at 32', the light will be caused to flash to indicate a catch. Should for any reason the fish get away, the boom returns to its former position, thus avoiding a false signal. It will be seen that when a catch is made, the activity of the fish may swing the boom repeatedly, providing a sequence of flashes, certain to attract an attendant. At the same time, the electric cell, being used only for brief intervals each time a contact is made, will have long life.

It will be appreciated that a device of the type described is used during adverse cold weather conditions, and that the structure is particularly adapted for simplicity of adjustment, and ease of observation to determine the working order of the moving parts, which essentially consist of the boom and contacting conductor. Such adjustments as may be desired are readily made by an attendant wearing gloves. The single pivoted boom provides a yielding device having adequate strength to withstand the shocks and stresses to which the device is likely to be subjected in operation.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An ice fishing apparatus comprising a base having an upstanding support column mounted thereon, means on the column for holding a reel, an elongated boom pivotally mounted on a horizontal axis centrally thereof on the upper end of said column, an eye for carrying a fish line mounted at one end of said boom, a flag affixed to the other end of said boom, a weight slidably mounted for movement along the length of said other end of said boom, means for affixing said weight to said boom at any selected position along the length thereof, a bracket assembly mounted on said column along the upper end thereof and extending above the upper end of said column, said bracket assembly including a bracket member having longitudinally spaced electric cell-receiving arms along its lower end, one of said arms having an insulating block on the side thereof facing the other arm, a socket for receiving an electric bulb at its upper end, an electric bulb in said socket having its central contact projecting beyond said socket, a resilient conductor extending along said bracket member having one end bearing on said insulating block on the side thereof facing the other arm, and the other end projecting into the region of but normally having spaced axial relation with the bulb contact, insulating means for mounting said conductor on said bracket member, an electric cell mounted between said arms having one of its poles bearing against said one end of the conductor, and its other pole in electrical contact with said other arm, and means affixed to the other end of said conductor projecting into the path of movement of the flag-bearing end of said boom, whereby upon upward movement of said flag bearing boom, said conductor is moved to engage the central contact of said bulb.

2. An ice fishing apparatus comprising a base having an upstanding support column mounted thereon, an elongated boom pivotally mounted on a horizontal axis centrally thereof on the upper end of said column, an eye for carrying a fish line mounted at one end of said boom, a flag affixed to the other end of said boom, a counterweight on the other end of said boom, a bracket assembly mounted on said column along the upper end thereof, and extending above the upper end of said column, said bracket assembly comprising a bracket member, an electric cell mounted on said bracket member at its lower end, a socket for receiving an electric bulb at its upper end, an electric bulb in said socket having its central contact projecting beyond said socket, a resilient conductor extending along and insulatingly mounted on said bracket member having one end adapted to contact a terminal of said cell, and the other end projecting to the region of but normally having spaced axial relation with the bulb contact, means for connecting the other terminal of said cell to said bracket member, and means affixed to the bulb contact end of said conductor projecting into the path of movement of the flag-bearing end of said boom, whereby upon upward movement of said flag bearing boom, said conductor is moved to engage the central contact of said bulb.

3. An ice fishing apparatus comprising a base having an upstanding support column, an elongated boom pivotally mounted on said column, a bracket assembly mounted on said column along the upper end thereof, and extending above the upper end of said column, comprising a bracket member, an electric cell mounted on said member and having one terminal connected thereto, an electric bulb mounted in the upper end of said bracket member with its central contact exposed, a resilient conductor extending along and insulatingly mounted on said bracket member having one end connected to the other terminal of said cell, and the other end projecting to the region of but normally having spaced relation with respect to the bulb contact, and means coacting with said boom and the upper end of said conductor for moving said conductor into contact with the central contact of said bulb upon pivotal movement of said boom in response to a catch.

4. An ice fishing apparatus comprising an upstanding support column, an elongated boom pivotally mounted on the upper end of said column, means for carrying a fish line at one end of said boom, a counterweight on the other end of said boom for holding the one end thereof in a desired position, a bracket member mounted on said column along the upper end thereof, having an electric bulb mounted therein with its central contact exposed, a resilient conductor insulatingly mounted on said bracket member and having a free end projecting to the region of but normally having spaced axial relation with the bulb contact, an electric cell mounted upon said bracket member having connections to said member and conductor, and means cooperating with said boom and conductor free end for effecting contact of said conductor with the central contact of said bulb upon movement of said boom in opposition to said counterweight.

5. In an ice fishing apparatus having an upstanding support column, and an elongated counterbalanced boom pivotally mounted thereon, said boom having a fish line carried at one end thereof, in combination, a bracket assembly adapted for mounting on said column along the upper end thereof comprising a bracket member having longitudinally spaced electric cell-receiving arms formed at one end, one of said arms having an insulating block on the side thereof facing the other arm, and a socket for receiving an electric bulb at its other end, an electric bulb in said socket having its central contact projecting beyond said socket, a resilient conductor extending along said bracket member having one end bearing on said insulating block on the side thereof facing the other arm, and the other end projecting to the region of but normally having spaced relation with the bulb contact, insulating means for mounting said conductor on said bracket member, an electric cell mounted between said arms having one of its poles bearing against said one end of the conductor, and its other pole in electrical contact with said other arm, and means affixed to the other end of said conductor adapted to project into the path of movement of the pivotally mounted boom, whereby said conductor can be yieldingly moved by the boom into contact with said central bulb contact.

References Cited in the file of this patent

UNITED STATES PATENTS

| 2,032,537 | Kozikowski | Mar. 3, 1936 |
| 2,143,997 | Parkinson | Jan. 17, 1939 |
| 2,370,601 | Wimpfheimer et al. | Feb. 27, 1945 |
| 2,564,980 | Kellermann | Aug. 21, 1951 |
| 2,567,777 | Massino | Sept. 11, 1951 |
| 2,628,443 | Weckerling | Feb. 17, 1953 |
| 2,643,371 | Sleeger | June 23, 1953 |

FOREIGN PATENTS

| 18,477 | Sweden | 1904 |